United States Patent [19]

Miller et al.

[11] Patent Number: 4,804,270
[45] Date of Patent: Feb. 14, 1989

[54] MULTI-AXIS ALIGNMENT APPARATUS

[75] Inventors: John M. Miller, Huntington Station; Richard O. Barton, Levittown; Michael T. Bergin, Bayside, all of N.Y.

[73] Assignee: Grumman Aerospace Corporation, Bethpage, N.Y.

[21] Appl. No.: 100,258

[22] Filed: Sep. 23, 1987

[51] Int. Cl.$^4$ ............................................. G01B 9/02
[52] U.S. Cl. ..................................... 356/355; 356/363
[58] Field of Search ............... 356/354, 355, 356, 363, 356/138, 150, 151, 152, 153

[56] References Cited

U.S. PATENT DOCUMENTS

| | | | |
|---|---|---|---|
| 3,269,254 | 8/1966 | Cooper et al. | 356/138 X |
| 3,375,750 | 4/1968 | Ellis et al. | 356/152 |
| 3,701,602 | 10/1972 | Bergin et al. | 356/400 X |
| 4,277,169 | 7/1981 | Krieg | 356/152 |
| 4,330,212 | 5/1982 | Miller | 356/354 |

*Primary Examiner*—Davis L. Willis
*Assistant Examiner*—Matthew W. Koren
*Attorney, Agent, or Firm*—Richard G. Geib; Daniel J. Tick; Bernard S. Hoffman

[57] ABSTRACT

Apparatus for measuring the displacement of a member relative to a reference plane has a transmitter and a receiver spaced therefrom at a predetermined distance. A reference energy beam coaxially passes through a light diffraction grating having a ruled surface. The grating passes a zero order part of the beam through undeviated and diffracts a multiplicity of beams of first, second, third, and higher order, at constant angles with the zero order part, the angles varying with the frequency of the ruled surface of the grating. A coaxial sleeve movably mounts the light diffraction grating to provide a roll zero reference. The zero order part of the beam provides the zero reference for pitch and yaw and the first order beams provides zero reference for roll. The lines of the ruled surface of the grating have a frequency matching the predetermined distance. The receiver has a container movably mounted to provide a roll zero reference, a pitch and yaw displacement indicator in the container and a roll indicator in the container.

12 Claims, 5 Drawing Sheets

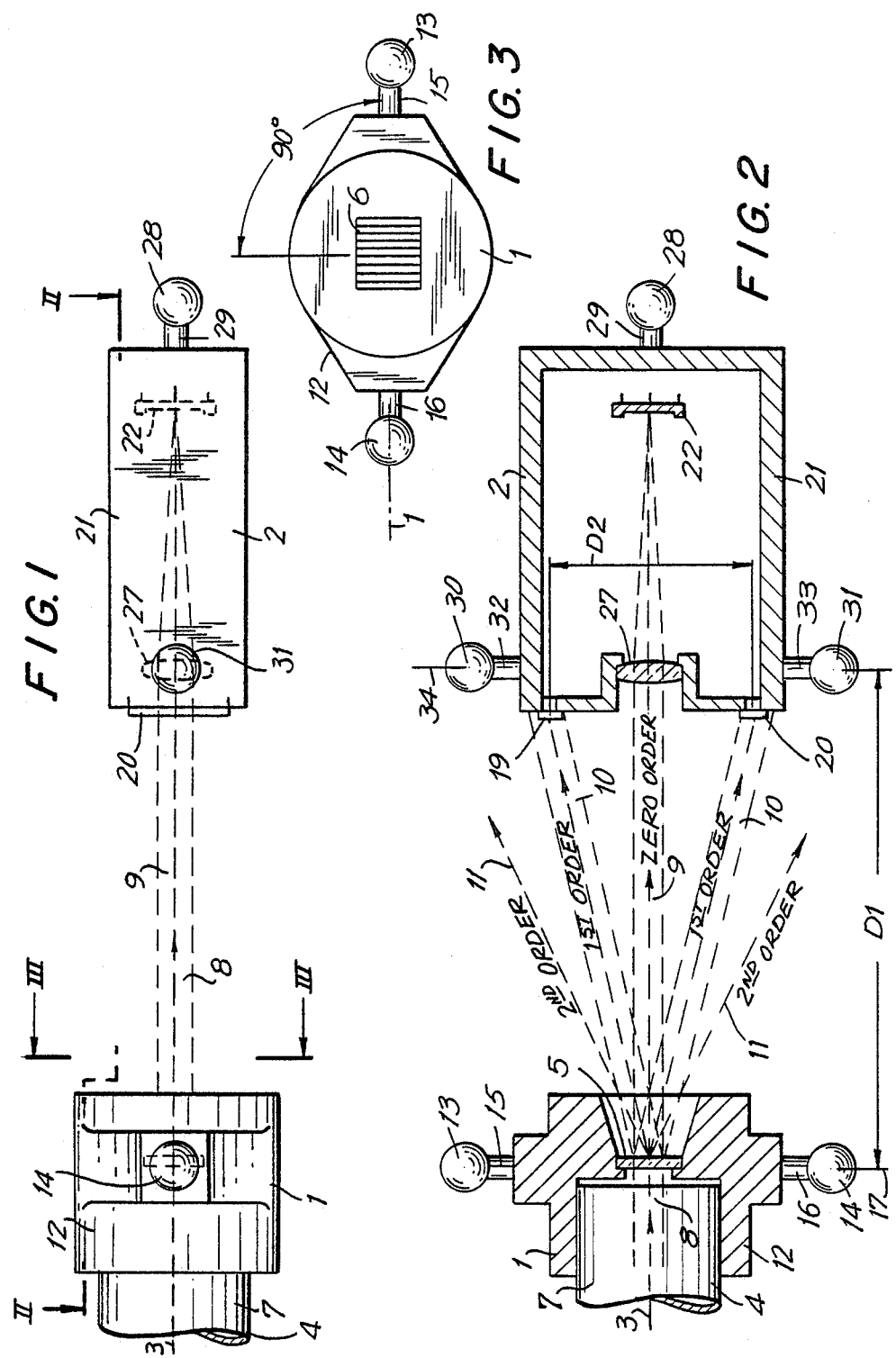

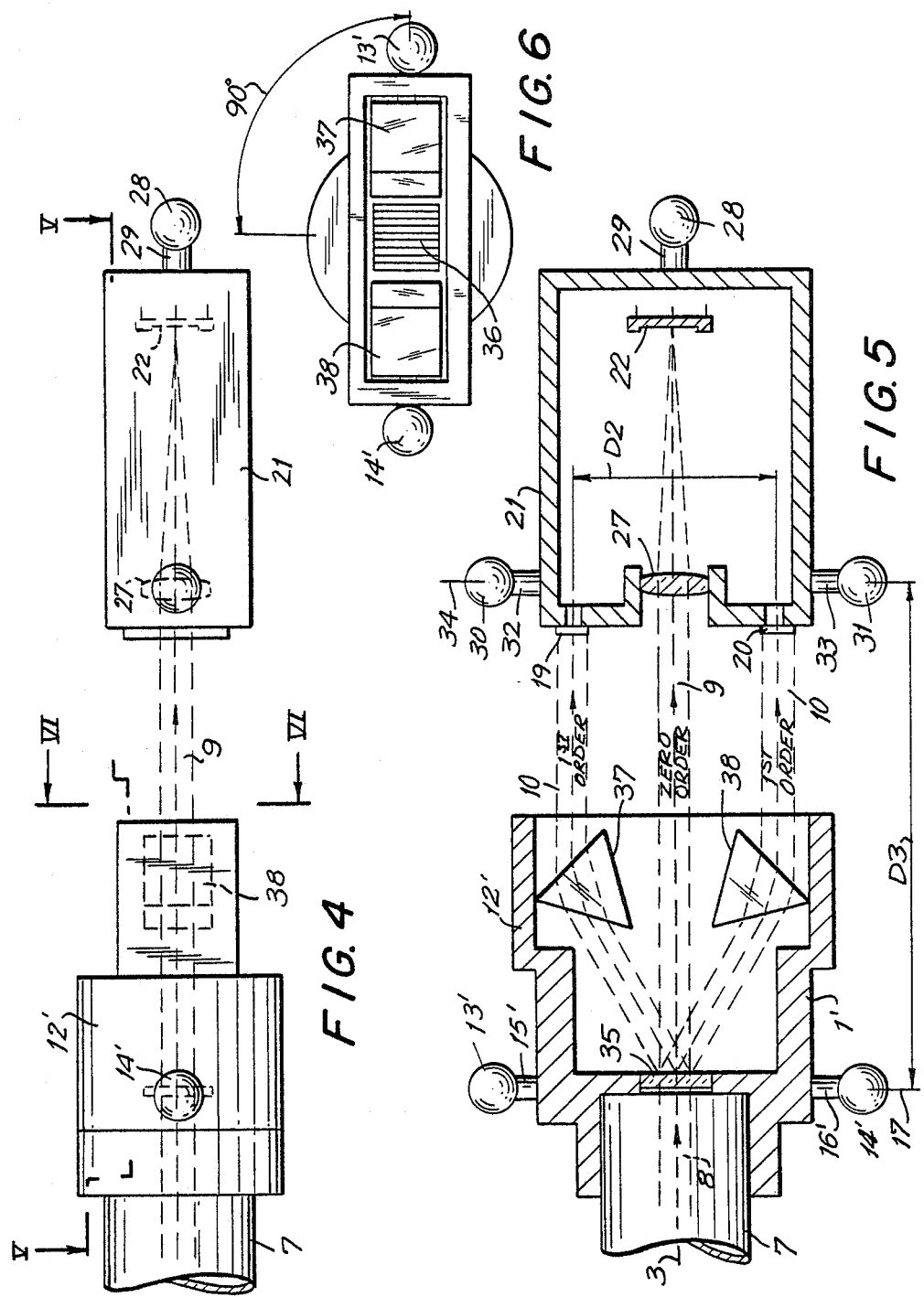

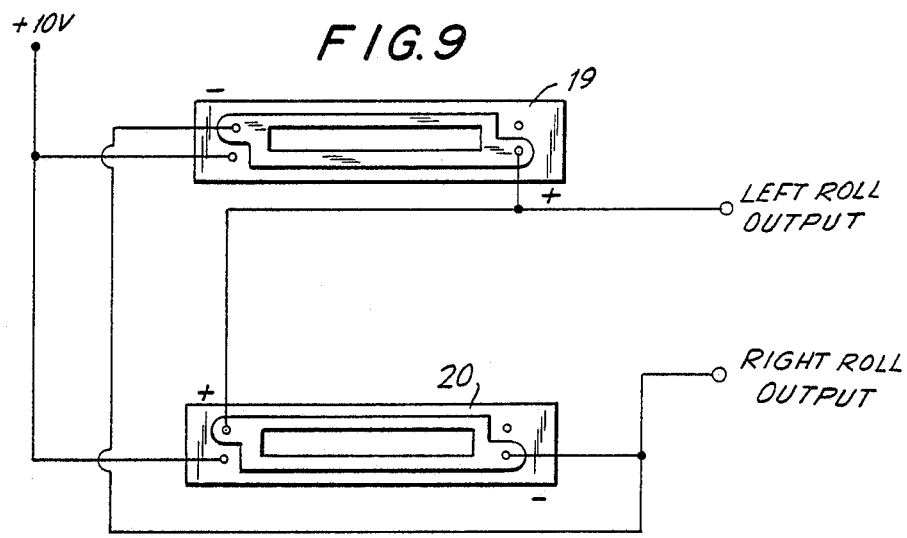
FIG. 9
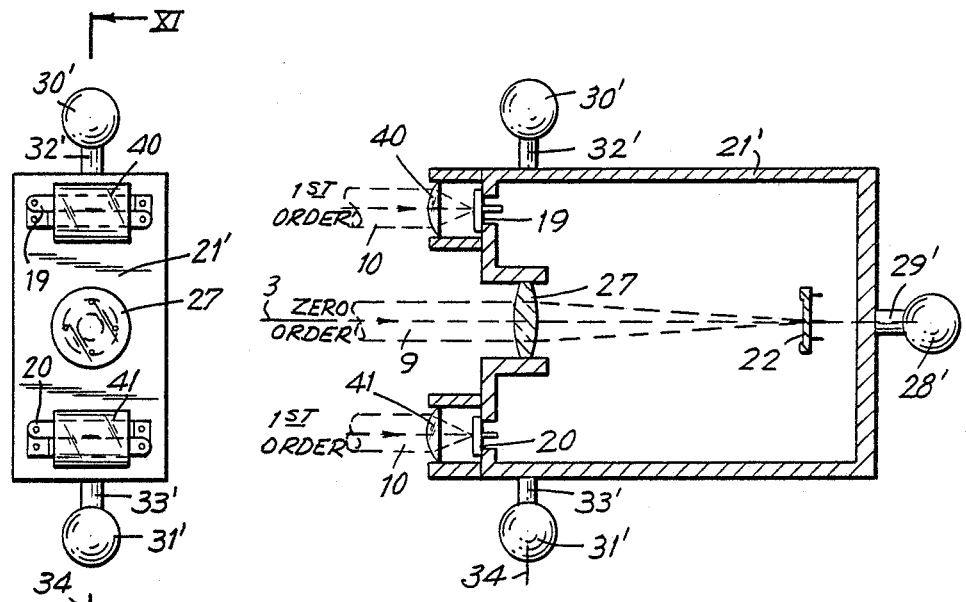
FIG. 10
FIG. 11

MULTI-AXIS ALIGNMENT APPARATUS

BACKGROUND OF THE INVENTION

The present invention relates to measurement and location apparatus. More particularly, the invention relates to multi-axis alignment apparatus for providing measurable angular information with respect to a ground plane.

Laser systems designed for a multitude of purposes have been generally commercially available since the 1960's. Basic refinements in these systems have included bulk reductions and the advent of the low power laser (with an output of the order of several milliwatts). With the compacting of laser technology, the number of practical laser applications have been compounded.

As compared to other conventional alignment techniques, the advantages of laser systems include increased sensitivity, faster recording of measurements and remote meter readout. These and other advantages have combined to provide impetus to an increasing trend toward the commercial use of lasers. In the field of manufacturing alignment techniques, laser devices are firmly embedded for applications such as aligning avionic systems on sophisticated aircraft. In this environment, the increased accuracy, decreased time required for alignment and the decrease in the necessary operator skill level all provide further incentives for employment of laser technology.

One reference pertaining to a type of optical measuring system is disclosed in U.S. Pat. No. 3,269,254, issued to L. Cooper et al. This device includes a graded mirror to define the roll, pitch and yaw orientation of a body to which the mirror is attached. The patentees use an autocollimation system to project the graded light pattern upon an image measuring reticle. A linear scale can be imposed upon the reticle for measuring angular displacement of the body. This scale is determinable based upon the distance of the collimating lens from the reticle and the focal length of the lens.

A fundamental problem with this type of configuration is that the collimator lens must be located close enough to the movable body to receive enough light rays to produce a discernable pattern at the reticle. The light source and reticle must also be displaced from the lens a distance no greater than its own focal length.

These and other inherent limitations restrict the Cooper system to a range of operation of about one to two feet between the movable body and imaging target, and to use with other than laser light sources. These are impractical limitations for the type of applications for which the present invention was intended. Nowhere has it been proposed that a purely electro-optical system may be employed to actually measure the degree of relative angular displacement between surfaces, in three axes, irrespective of the distance between the reference source and target.

In U.S. Pat. No. 3,701,602 of Bergin et al, a joint inventor of the present application, a diffraction device produces zero and first order beams from a single beam source. One or more of the beams is focussed by the diffraction device as with a spherical lens.

In U.S. Pat. No. 4,330,212 of Miller, a joint inventor of the present application, a single beam is broken up into a multiple of beams by a diffraction grating. Each known frequency of the ruling lines of the grating provides a known fixed angle between each diffracted order. The known fixed angle provides the measurement for any angular deviation from null.

The principal object of the invention is to provide new and improved alignment apparatus.

An object of the invention is to provide nongravity multi-axis alignment apparatus of simple structure, which is inexpensive in manufacture.

Another object of the invention is to provide single instrument apparatus utilizing a non-gravity reference to measure three-axis angular displacement of pitch, yaw and roll.

Still another object of the invention is to provide multi-axis alignment apparatus which is considerably less expensive in manufacture than the ST988 Roll Control Assembly and ST956 Tri-Axis Target and substantially eliminates polarization sensitivity, thereby permitting its use through intermediate glass elements, such as, for example, aircraft windshields.

Yet another object of the invention is to provide multi-axis alignment apparatus for boresighting military aircraft such as, for example, the Grumman A-6 and F-14 aircraft, with efficiency, effectiveness and reliability.

Another object of the invention is to provide multi-axis alignment apparatus for three-axis boresight control of all future aircraft and spacecraft with efficiency, effectiveness and reliability.

Still another object of the invention is to provide multi-axis alignment apparatus of simple structure, which is inexpensive in manufacture and is applicable to machine tool alignment for correcting angular errors in machine head or bed motion.

Yet another object of the invention is to provide multi-axis alignment apparatus which is readily adaptable to aligning precision guide rails in robotic systems or machinery centers, for example.

BRIEF SUMMARY OF THE INVENTION

The tri-axis alignment apparatus of the invention utilizes one single beam laser as a reference source for a multi-axis alignment system. A light diffraction grating having a ruled surface breaks up the single beam into multiple beams radiating at fixed angles from the single source. Constant deviation prisms turn the two first order angular offset beams, making them parallel to the zero order part of the beam and thus unaffected by distance between the reference source and the receiver.

In the apparatus of the invention, a target receiver system uses the zero order part of the beam and either divergent, or parallel first order beams impinged on single axis, position sensing diffused junction silicon photodiodes. The positive and negative outputs of the photodiodes are coupled to be insensitive to linear displacement while registering differential, or roll, displacement for a pitch, yaw or roll readout.

In a modification of the receiver of the invention, the zero order part of the beam has a spherical convex lens focusing on a position sensing Quantrad PS200, or equivalent to act as a collimator measuring pitch and yaw. Additionally, two cylindrical convex lenses intercept the first order beams, focusing said beams as a line onto the PS-100 single axis photodiodes. Cylindrical lenses minimize any apparent roll shift due to linear offsets between the reference energy source or transmitter and the receiver or target, while registering any rotation of the source or the receiver about the zero order axis as a roll offset and produce a three-axis pitch, yaw and roll readout.

In accordance with the invention, apparatus for measuring the angular displacement of a member relative to a reference plane comprises transmitting means having a ground barrel, a light diffraction grating having a ruled surface, a source of coherent light for providing a reference energy beam substantially coaxially centered within the ground barrel and substantially coaxially passing through the grating whereby the grating passes a zero order part of the beam through undeviated and diffracts a multiplicity of beams of first, second, third, and higher order, at constant angles with the zero order part, the angles varying with the frequency of the ruled surface of the grating, and sleeve means movably mounting the ground barrel and the light diffraction grating substantially coaxially to provide a roll zero reference, the zero order part of the beam providing the zero reference for pitch and yaw and the first order beams providing zero reference for roll.

Receiving means is located at a predetermined distance from the transmitting means. The lines of the ruled surface of the grating have a frequency matching the predetermined distance. The receiving means has container means movably mounted to provide a roll zero reference, pitch and yaw displacement indicating means in the container means, and roll indicating means in the container means.

The pitch and yaw displacement indicating means comprises position sensing photosensitive means substantially coaxially mounted in the container means and functioning as a collimator, display means electrically connected to the photosensitive means and a convex lens substantially coaxially mounted in the container means for focusing the zero order part of the beam from the transmitting means onto the photosensitive means whereby a tilt of the transmitting or receiving means causes the focussed spot to move on the photosensitive means thereby indicating a pitch and/or yaw displacement on the display means.

The roll indicating means comprises a pair of photosensitive cells colinearly positioned with the convex lens on the container means on opposite sides of the lens and equidistantly spaced from the lens by a distance which determines the frequency of the ruled surface of the grating, whereby the first order beams from the transmitting means impinge on the centers of the photosensitive cells when both the transmitting means and the receiving means are in null position and the first order beams move on the photosensitive cells when the transmitting or receiving means is rotated about the zero order reference line thereby indicating a roll in the display means.

The source of coherent light is a helium-neon laser and the sleeve means includes ball mounting means on a line substantially perpendicular to and intersecting the axis of the sleeve means, and the container means includes ball mounting means on the axis of the container means and ball mounting means on a line substantially perpendicular to and intersecting the axis of the container means, the ball mounting means of the container means being substantially coplanar.

The transmitting means further has a pair of constant deviation prisms in the sleeve means mounted in a manner whereby the first order beams are deviated to substantially parallel relation to the zero order part of the beam thereby eliminating distance sensitivity of the receiving means relative to the roll zero reference.

The receiving means further has a pair of cylindrical lenses each positioned in operative proximity with a corresponding one of the photosensitive cells and intercepting the first order beams and producing its focal line on the corresponding one of the photosensitive cells.

The receiving means further has additional photosensitive means in operative proximity with the convex lens and beamsplitting means positioned in operative proximity with the convex lens for transmitting substantially 50% of the zero order part of the beam from the transmitting means to the convex lens and deflecting substantially 50% of the zero order part of the beam to the additional photosensitive means whereby the additional photosensitive means provides "X" and "Y" linear measurements.

In accordance with the invention, a method of measuring the displacement of a member relative to a reference plane, comprises the steps of transmitting a beam of coherent light through a diffraction grating having a surface ruled with diffracting lines. The grating is aligned with the beam of coherent light to pass a zero order part of such beam through undeviated while diffracting a multiplicity of beams of ascending order at constant angles from the zero order part. The angles vary with the frequency of the ruled surface of the grating. The grating is mounted in a roll zero reference with the zero order part of the beam providing the zero reference for pitch and yaw and first order beams providing zero reference for roll. Pitch and yaw displacement from the zero order part of the beam from the roll zero reference are sensed and indicated. Roll from the first order beams from the roll zero reference is sensed and indicated.

The pitch and yaw displacement are sensed and indicated by mounting position sensing photosensitive means substantially coaxially, displaying the position of the beam from the roll zero reference, and focusing the zero order part of the beam from the roll zero reference onto the photosensitive means whereby a tilt of the roll zero reference or the photosensitive means causes the focussed spot to move on the photosensitive means thereby displaying a pitch and/or yaw displacement.

The roll displacement is sensed and indicated by positioning a pair of photosensitive cells colinearly with the zero order part of the beam from the roll zero reference on opposite sides of the zero order part of the beam by a distance determined by the frequency of the ruled lines of the grating whereby the first order beams from the transmitting means impinge on the centers of the photosensitive cells when both the roll zero reference and the photosensitive cells are in null position and the first order beams move on the photosensitive cells when the roll zero reference or the photosensitive cells is rotated about the reference plane thereby displaying a roll.

The first order beams are deviated to substantially parallel relation with the zero order part of the beam thereby eliminating distance sensitivity of the photosensitive cells relative to the roll zero reference.

The first order beams are intercepted in operative proximity with the photosensitive cells and focal lines thereof are directed onto the photosensitive cells.

The zero order part of the beam is beamsplit and substantially 50% of the zero order part of the beam from the roll zero reference is transmitted to the photosensitive means and substantially 50% of the zero order part of the beam is deflected to additional photosensitive means for providing "X" and "Y" measurements.

BRIEF DESCRIPTION OF THE DRAWINGS

In order that the invention may be readily carried into effect, it will now be described with reference to the accompanying drawings, wherein:

FIG. 1 is a schematic diagram of a first embodiment of the apparatus of the invention for measuring the displacement of a member relative to a reference plane;

FIG. 2 is a view, partly in section, taken along the lines II—II, of FIG. 1;

FIG. 3 is a view, taken along the lines III—III, of FIG. 1;

FIG. 4 is a schematic diagram of a second embodiment of the apparatus of the invention:

FIG. 5 is a view, partly in section, taken along the lines V—V, of FIG. 4;

FIG. 6 is a view, taken along the lines VI—VI, of FIG. 4;

FIG. 9 is a circuit diagram of an embodiment of the electrical connection of the photodiodes 19 and 20 of the apparatus of the invention for sensing roll;

FIG. 10 is a view of a first modification of the second embodiment of the invention;

FIG. 11 is a cross-sectional view, taken along the lines XI—XI, of FIG. 10;

DETAILED DESCRIPTION OF PREFERRED EMBODIMENTS

Figure 7:
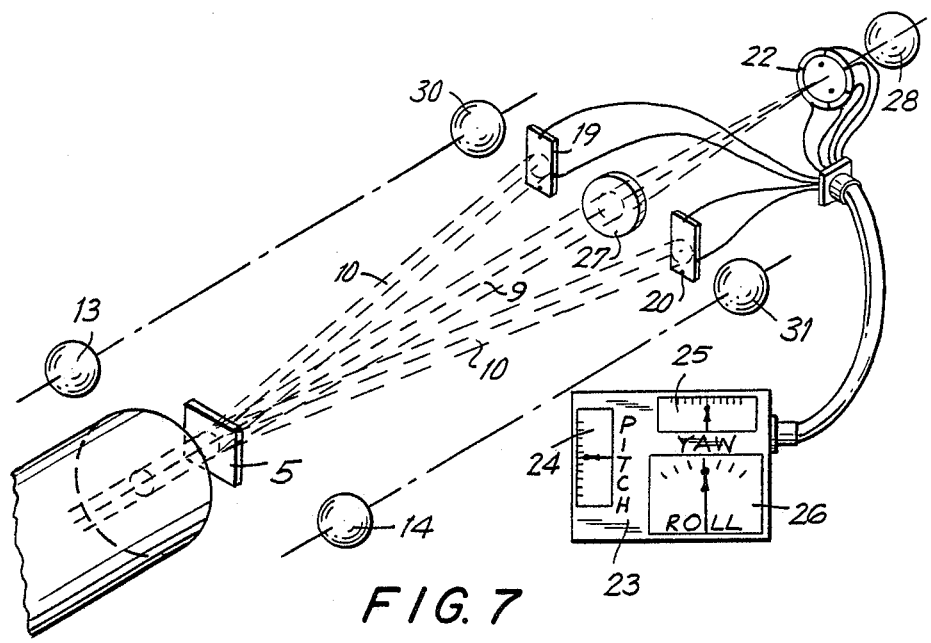
FIG. 7 is a schematic diagram showing the basic components of the first embodiment of the invention indicating no pitch, yaw or roll.

The apparatus of the invention measures the displacement of a member 1 or 2 relative to a reference plane or zero order reference line 3 (FIGS. 2,5,11,13 and 15); the member 1 being a transmitter and the number 2 being a receiver or target.

In the first embodiment of the invention, shown in FIGS. 1 to 3, the transmitter 1 has a ground barrel 4. A light diffraction grating 5 is substantially coaxially mounted in the ground barrel 4, as shown in FIG. 2, and has a ruled surface 6 (FIG. 3). A source of coherent light (FIGS. 1 and 2) provides a reference energy beam 8 (FIGS. 1 and 2) substantially coaxially centered within the ground barrel 4. The source of coherent light 7 may comprise a helium-neon laser, or other highly collimated known energy source. The energy beam 8 is precisely coaxial with the ground barrel 4.

The light diffraction grating 5 may comprise a blazed or Ronchi ruling, coaxial with the energy beam 8, so that said grating passes a zero order part 9 (FIGS. 1, 2, 4, 5, 7, 8, 11, 13 and 15) of said beam through undeviated and diffracts a multiplicity of beams of first, second, third, and higher, order at constant angles with said zero order part. The first order beams 10 and the second order beams 11 are shown in FIG. 2 and said first order beam is shown in FIGS. 2, 5, 7, 8, 11, 13 and 15. The angles of the first, second, third, and so on, beams with the zero order part vary with the frequency of the ruled surface 6 of the grating 5 (FIGS. 3 and 6).

A sleeve 12 of close tolerance is fitted on the ground barrel 4 and includes mounting balls 13 and 14 on studs 15 and 16, respectively, extending on a line 17 perpendicular to and intersecting the axis 3 of said sleeve (FIGS. 2 and 3). The sleeve 12 thus movably mounts the ground barrel 4 to provide a roll zero reference. The light diffraction grating 5 is mounted in the sleeve 12 in a manner whereby the lines of the ruled surface 6 are perpendicular to the axis 3 of the sleeve 12 between the mounting balls 13 and 14. The zero order part 9 of the beam provides the zero reference for pitch and yaw and the first order beams 10 provide the zero reference for roll. All the orders of diffracted beams are thus transmitted along the zero reference line 3.

In the first embodiment of the invention, the receiver 2 is located at a predetermined distance D1 (FIG. 2) from the transmitter 1. The lines of the ruled surface 6 of the grating 5 have a frequency selected to match the distance D1 and the spacing D2 between a pair of linear photocells 19 and 20 of the receiver (FIGS. 2 and 5).

Figure 8:
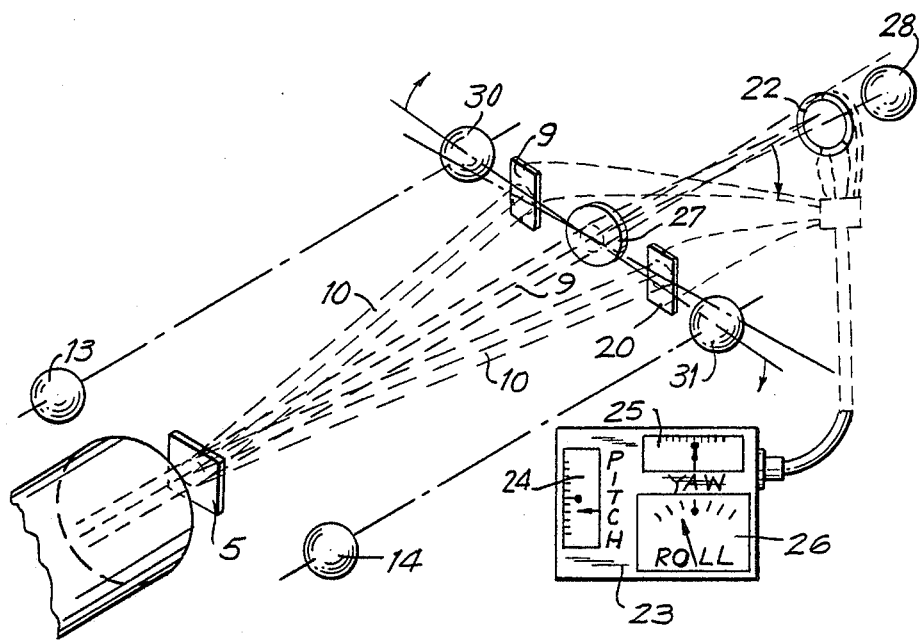
FIG. 8 is a schematic diagram showing the basic components of the first embodiment of the invention indicating pitch and roll.

The receiver 2 has a container 21 (FIGS. 1, 2, 4 and 5) and a position sensing photocell 22 (FIGS. 1, 2, 4, 5, 7, 8, 11, 13 and 15) substantially coaxially mounted in said container and functioning as a collimator. A display device Z3 of any suitable type such as, for example, three ammeters 24, 25 and 26, as shown in FIGS. 7 and 8, is electrically connected to the position sensing photocell 22, as shown in FIGS. 7 and 8. In FIGS. 7 and 8, the photocell 22 is electrically connected to the ammeters 24 and 25, labelled "Pitch" and "Yaw," respectively. The photocell 22 may comprise any suitable photocell such as, for example, a Quantrad PS200 diffused junction silicon photodiode.

The display device 23 (FIGS. 7 and 8) includes a preamp circuit for amplifying the low voltage signals from the photocell 22 and the cross-coupled single axis photocells 19 and 20. The amplified signals are displayed on the analog or digital ammeters which are calibrated for correct angular readout. Two Cubic Keuffel and Esser two-axis displays with some voltage modifications may be utilized in tandem to display output signals.

A convex lens 27 (FIGS. 1, 2, 4, 5, 7, 8, 11, 13 and 15) is coaxially mounted in the container 21 and focuses the zero order part 9 of the beam 8 from the transmitter 1 onto the photocell 22, as shown in FIGS. 1, 2, 4, 5, 11, 13 and 15. A tilt of the transmitter 1 or receiver 2 causes the focussed spot to move on the position sensing photocell 22 thereby indicating a pitch, as shown in FIG. 8, and/or yaw displacement on the meter 24 of the display device 23. The spherical convex lens 27 provides insensitivity of the transmitter 1 and receiver 2 to linear motion. Sensitivity would require very sensitive linear alignment.

The photocells 19 and 20 (FIGS. 2, 5, 7 and 8 to 13) are colinearly positioned with the convex lens 27 on the container 21 on opposite sides of said lens and equidistantly spaced from said lens by a distance which determines the frequency of the ruled surface 6 of the grating 5 (FIG. 2). The first order beams 10 from the transmitter 1 (FIG. 2) impinge in the centers of the photocells 19 and 20, which may comprise any suitable known photocells such as, an example, Quantrad PS100 linear diffused junction photodiodes, when both said transmitter and said receiver are in null position (FIG. 7). The first order beams 10 move on the photocells 19 and 20, as shown in FIG. 8, when the transmitter 1 or receiver 2 is rotated about the zero order reference line 3 thereby indicating a roll on the meter 26 of the displace device 23 (FIG. 8).

The container 21 includes a mounting ball 28 on a stud 29 extending along the axis 3 of said container (FIGS. 1, 2, 4, and 5) and mounting balls 30 and 31 on mounting studs 32 and 33, respectively, extending on a line 34 perpendicular to and intersecting said axis of said container (FIGS. 2 and 5). The mounting balls 28, 30 and 31 of the container 21 are coplanar.

In the second embodiment of the invention, shown in FIGS. 4, 5 and 6, the light diffraction grating 35 (FIG. 5) of the transmitter 1' has a high frequency ruled surface 36 (FIG. 6) to provide a convenient large deviation between the two first order beams 10. A pair of constant deviation prisms 37 and 38 are provided in the sleeve 12' of the transmitter 11' and are mounted, as shown in FIG. 5, in a manner whereby the first order beams 10 are deviated to parallel relation to the zero order part 9 of the beam 8 (FIG. 5). the prisms 37 and 38 are provided with pyramidal angles. The provision of the parallel first order beams 10 permits the spacing D3 between the transmitter 1' and the receiver 21 to be infinitely variable.

The sleeve 12' of the embodiment of FIGS. 4, 5 and 6 includes mounting balls 13' and 14' on studs 15' and 16', respectively, extending on a line 17 perpendicular to and intersecting the axis 3 of said sleeve.

Roll sensitivity to vertical linear offset of the target or receiver 2 relative to the transmitter 1 or 1' is reduced by connecting the linear photodiodes 19 and 20 in the manner shown in FIG. 9. When the photocells 19 and 20 are connected as shown in FIG. 9, only a differential displacement of the impinged first order beams 10 will register as a roll offset.

Roll sensitivity to horizontal linear offsets of the target or receiver 2 relative to the transmitter 1 or 1' is greatly reduced by cylindrical lenses 40 and 41 (FIGS. 10 to 13), positioned in operative proximity with the photocells 19 and 20, respectively, and intercepting the first order beams 10, as shown in FIGS. 10 to 13. The cylindrical lens 40 produces its focal line on the photocell 19 and the cylindrical lens 41 produces its focal line on the photocell 20. The cylindrical lenses 40 and 41 are mounted on the container 21', as shown in FIGS. 10 to 13.

Figures 12, 13:
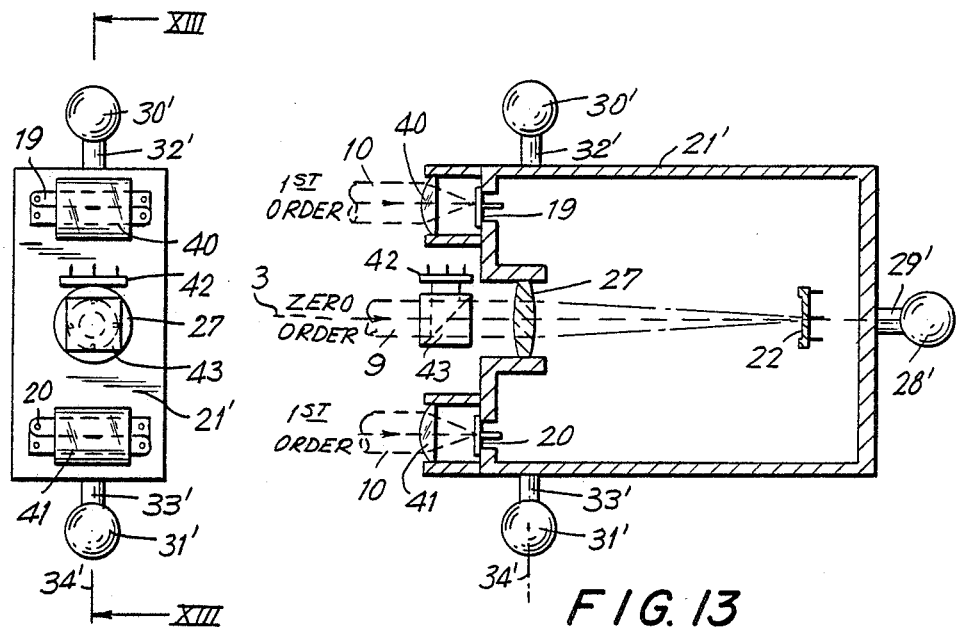
FIG. 12 is a view of a second modification of the second embodiment of the invention.
FIG. 13 is a cross-sectional view, taken along the lines XIII—XIII, of FIG. 12.

The container 21' of the modifications of FIGS. 10 and 11 and 12 and 13 includes a mounting ball 28' on a stud 29' extending on the axis 3 of said container and mounting balls 30' and 31' on studs 32' and 33', respectively, extending on a line 34' perpendicualr to and intersecting said axis (FIGS. 11 and 13).

The second modification of the second embodiment of the apparatus of the invention, shown in FIGS. 12 and 13, provides a full five axis target for pitch, yaw, roll and "X" and "Y" null and displacement monitoring. This modification utilizes an additional photocell 42 of any suitable known type such as, for example, a Quantrad PS200 positioned in operative proximity with the convex lens 27 (FIGS. 12 and 13). A beamsplitter 43 of any suitable known type is also positioned in operative proximity with the convex lens 27, as shown in FIGS. 12 and 13, and functions to transmit substantially 50% of the zero order part 9 of the beam 8 from the transmitter 1', to said convex lens. This 50% is focussed on the photocell 22 which thereby functions as a pitch and yaw collimeter (FIG. 13).

The beamsplitter 43 deflects substantially 50% of the zero order part 9 of the beam 8 from the transmitter 1' to the additional photocell 42. The photocell 42 provides two position or two-axis sensing and therefore produces "X" and "Y" measurements. The two first order beams 10 which impinge on the photocells 40 and 41 indicate roll offsets between the transmitter 1' and the receiver 2' thereby providing a full simultaneous fiveaxis target or receiver measurement apparatus from a single collimated reference beam.

The second modification, shown in FIGS. 12 and 13, requires additional preamplification and an additional display device for the "X," "Y" display. An alternative to the use of two display devices is a single five axis derivative of a standard display device.

Figures 14, 15:
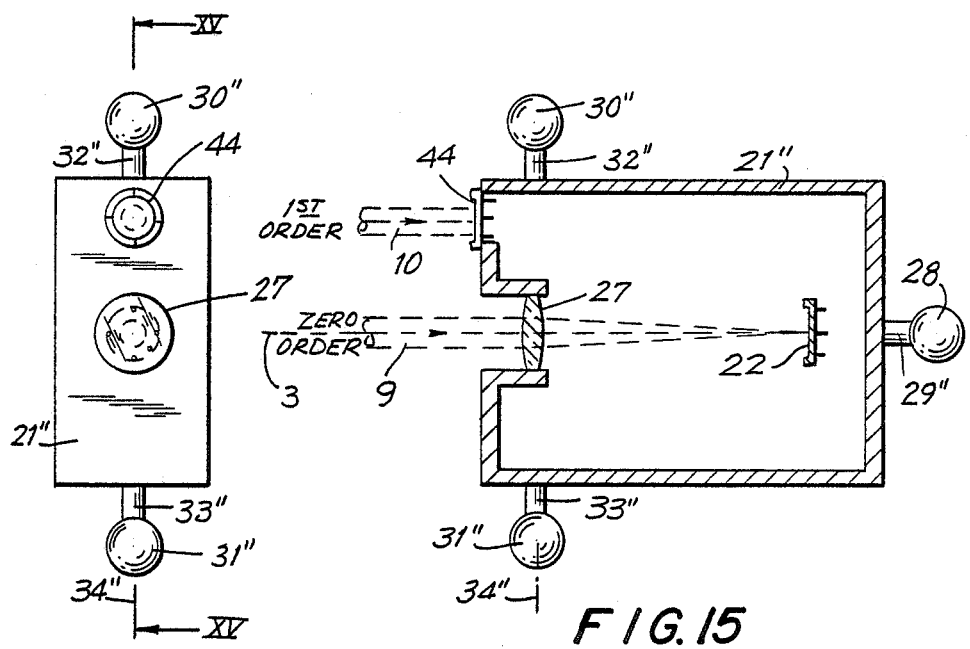
FIG. 14 is a view of a third modification of the second embodiment of the invention.
FIG. 15 is a cross-sectional view, taken along the lines XV—XV, of FIG. 14.

A third modification, shown in FIGS. 14 and 15, of the second embodiment of the apparatus of the invention utilizes the zero order beam 9 for pitch and yaw sensing. In the modification of FIGS. 14 and 15, one first order beam 10 impinges on a position-sensing photodiode 44 which provides "X" and "Y" measurements. This modification functions as a simultaneous four axis target or receiver and provides measurements of pitch, yaw, "X" and "Y". These measurements could be utilized, by a well known self-checking or inverting procedure, to align the first order beams 10 parallel to the zero order beam 9 in the second embodiment of the apparatus of the invention, shown in FIGS. 4, 5 and 6.

The container 21" of the third modification of FIGS. 14 and 15 includes a mounting ball 28" on a stud 29" extending on the axis 3 of said container and mounting balls 30" and 31" on studs 32" and 33," respectively, extending on a line 34" perpendicular to and intersecting said axis.

Although shown and described in what are believed to be the most practical and preferred embodiments, it is apparent that departures from the specific method and design described and shown will suggest themselves to those skilled in the art and may be made without departing from the spirit and scope of the invention. We, therefore, do not wish to restrict ourselves to the particular construction described and illustrated, but desire to avail ourselves of all modifications that may fall within the scope of the appended claims.

We claim:

1. Apparatus for measuring the displacement of a member relative to a reference plane, said apparatus comprising transmitting means having a ground barrel, a light diffraction grating having a ruled surface, a source of coherent light for providing a reference energy beam substantially coaxially centered within said ground barrel and substantially coaxially passing through said grating whereby said grating passes a zero order part of said beam through undeviated and diffracts a multiplicity of beams of first, second, third, and higher order, at constant angles with said zero order part, said angles varying with the frequency of the ruled surface of said grating, and sleeve means movably mounting said ground barrel and said light diffraction grating substantially coaxially to provide a roll zero reference, said zero order part of said beam providing the zero reference for pitch and yaw and said first order beams providing zero reference for roll; and receiving means located at a predetermined distance from said transmitting means, the lines of said ruled surface of said grating having a frequency matching said predetermined distance, said receiving means having container means movably mounted to provide a roll zero reference, pitch and yaw displacement indicating means in said container means, and roll indicating means in said container means.

2. Apparatus as claimed in claim 1, wherein said pitch and yaw displacement indicating means comprises position sensing photosensitive means substantially coaxially mounted in said container means and functioning as a collimator, display means electrically connected to said photosensitive means and a convex lens substantially coaxially mounted in said container means for focusing said zero order part of said beam from said transmitting means onto said photosensitive means whereby a tilt of said transmitting or receiving means causes the focussed spot to move on said photosensitive means thereby indicating a pitch and/or yaw displacement on said display means.

3. Apparatus as claimed in claim 2, wherein said roll indicating means comprises a pair of photosensitive cells colinearly positioned with said convex lens on said container means on opposite sides of said lens and equidistantly spaced from said lens by a distance which determines the frequency of the ruled surface of said grating, whereby the first order beams from said transmitting means impinge on the centers of said photosensitive cells when both said transmitting means and said receiving means are in null position and said first order beams move on said photosensitive cells when said transmitting or receiving means is rotated about the zero order reference line thereby indicating a roll in said display means.

4. Apparatus as claimed in claim 3, wherein said source of coherent light is a helium-neon laser and said sleeve means includes ball mounting means on a line substantially perpendicular to and intersecting the axis of said sleeve means, and said container means includes ball mounting means on the axis of said container means and ball mounting means on a line substantially perpendicular to and intersecting the axis of said container means, the ball mounting means of said container means being substantially coplanar.

5. Apparatus a claimed in claim 3, wherein said transmitting means further has a pair of constant deviation prisms in said sleeve means mounted in a manner whereby said first order beams are deviated to substantially parallel relation to said zero order part of said beam thereby eliminating distance sensitivity of said receiving means relative to said roll zero reference.

6. Apparatus as claimed in claim 3, wherein said receiving means further has a pair of cylindrical lenses each positioned in operative proximity with a corresponding one of said photosensitive cells and intercepting said first order beams and producing its focal line on the corresponding one of said photosensitive cells.

7. Apparatus as claimed in claim 6, wherein said receiving means further has additional photosensitive means in operative proximity with said convex lens and beamsplitting means positioned in operative proximity with said convex lens for transmitting substantially 50% of said zero order part of said beam from said transmitting means to said convex lens and deflecting substantially 50% of said zero order part of said beam to said additional photosensitive means whereby said additional photosensitive means provides "X" and "Y" measurements.

8. A method of measuring the displacement of a member relative to a reference plane, said method comprising the steps of
transmitting a beam of coherent light through a diffraction grating having a surface ruled with defracting lines;
aligning said grating with said beam of coherent light to pass a zero order part of such beam through undeviated while diffracting a multiplicity of beams of ascending order at constant angles from said zero order part, said angles varying with the frequency of the ruled surface of said grating;
mounting said grating in a roll zero reference with said zero order part of said beam providing the zero reference for pitch and yaw and first order beams providing zero reference for roll;
sensing and indicating pitch and yaw displacement from said zero order part of said beam from said roll zero reference by mounting position sensing photosensitive means substantially coaxially, displaying the position of said beam from said roll zero reference, and focusing said zero order part of said beam from said roll zero reference onto said photosensitive means whereby a tilt of said roll zero reference or said photosensitive means causes the focussed spot to move on said photosensitive means thereby displaying a pitch and/or yaw displacement; and
sensing and indicating roll from said first order beams from said roll zero reference.

9. A method as claimed in claim 8, wherein sensing and indicating roll displacement comprises positioning a pair of photosensitive cells colinearly with said zero order part of said beam from said roll zero reference on opposite sides of said zero order part of said beam by a distance determined by the frequency of the ruled lines of said grating whereby the first order beams from said transmitting means impinge on the centers of such photosensitive cells when both said roll zero reference and said photosensitive cells are in null position and said first order beams move on said photosensitive cells when said roll zero reference or said photosensitive cells is rotated about said reference plane thereby displaying a roll.

10. A method as claimed in claim 9, further comprising the step of deviating said first order beams to substantially parallel condition thereby eliminating distance sensitivity of said photosensitive cells relative to said roll zero reference.

11. A method as claimed in claim 9, further comprising the step of intercepting said first order beams in operative proximity with said photosensitive cells and directing focal lines thereof onto said photosensitive cells.

12. A method as claimed in claim 11, further comprising the step of beamsplitting said zero order part of said beam and transmitting substantially 50% of said zero order part of said beam from said roll zero reference to said photosensitive means and deflecting substantially 50% of said zero order part of said beam to additional photosensitive means for providing "X" and "Y" measurements.

* * * * *